United States Patent
Grasser et al.

(10) Patent No.: US 7,407,291 B2
(45) Date of Patent: Aug. 5, 2008

(54) MICROMIRROR PROJECTION OF POLARIZED LIGHT

(75) Inventors: Regis Grasser, Mountain View, CA (US); Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 405 days.

(21) Appl. No.: 11/145,466

(22) Filed: Jun. 3, 2005

(65) Prior Publication Data

US 2005/0270498 A1 Dec. 8, 2005

Related U.S. Application Data

(60) Provisional application No. 60/577,422, filed on Jun. 4, 2004.

(51) Int. Cl.
*G03B 21/28* (2006.01)
*G03B 21/14* (2006.01)

(52) U.S. Cl. .............................. 353/20; 353/99; 348/771

(58) Field of Classification Search .................. 353/20, 353/74–78, 84, 99; 359/460, 456, 457; 348/771, 348/794
See application file for complete search history.

(56) References Cited

U.S. PATENT DOCUMENTS

| | | | |
|---|---|---|---|
| 3,941,901 A | 3/1976 | Harsch | 427/108 |
| 5,739,296 A | 4/1998 | Gvon et al. | 534/577 |
| 5,751,388 A | 5/1998 | Larson | 349/96 |
| 5,835,256 A | 11/1998 | Huibers | 359/291 |
| 6,388,661 B1 | 5/2002 | Richards | 345/204 |
| 6,396,619 B1 * | 5/2002 | Huibers et al. | 359/291 |
| 6,399,166 B1 | 6/2002 | Khan et al. | 428/1.31 |
| 6,563,640 B1 | 5/2003 | Ignatov et al. | 359/491 |
| 7,168,808 B2 * | 1/2007 | Perlin et al. | 353/7 |
| 2002/0090188 A1 | 7/2002 | Lazarev et al. | 385/128 |
| 2003/0002015 A1 * | 1/2003 | Coates | 353/20 |
| 2003/0214631 A1 * | 11/2003 | Svardal et al. | 353/8 |
| 2003/0218726 A1 | 11/2003 | Huibers | 353/84 |
| 2004/0046941 A1 | 3/2004 | Yamamoto | 353/31 |
| 2004/0070736 A1 | 4/2004 | Roddy et al. | 353/31 |
| 2004/0105159 A1 | 6/2004 | Saccomanno et al. | 359/599 |
| 2004/0155856 A1 | 8/2004 | Richards | 345/102 |
| 2005/0041213 A1 * | 2/2005 | Paukshto | 353/20 |
| 2005/0078278 A1 * | 4/2005 | Uehara et al. | 353/20 |

\* cited by examiner

*Primary Examiner*—Andrew T Sever
(74) *Attorney, Agent, or Firm*—Wade James Brady, III; Frederick J. Telecky, Jr.

(57) ABSTRACT

The micromirror-based projection system of the present invention uses polarized illumination light in producing desired images on a display target. The display target has coated thereon a polarization film that absorbs most of the ambient light that would be incident onto the display target otherwise. Polarized illumination light is provided incident to the reflective surfaces of the spatial light modulator. The polarization direction of the illumination light can be associated with the rotation axes of the micromirrors and the polarization direction of the polarized film on the display target.

27 Claims, 6 Drawing Sheets

MICROMIRROR PROJECTION OF POLARIZED LIGHT

CROSS-REFERENCE TO RELATED APPLICATIONS

This U.S. patent application claims priority under 35 U.S.C. 119(e) of U.S. provisional patent application Ser. No. 60/577,422 filed Jun. 4, 2004, the subject matter being incorporated herein by reference.

TECHNICAL FIELD OF THE INVENTION

The present invention is generally related to the art of display systems having micromirror-based spatial light modulators, and more particularly, to such display systems using polarized light.

BACKGROUND OF THE INVENTION

In display applications, contrast ratio is the ratio of luminance between the brightest white that can be produced and the darkest black that can be produced. It is a major determinant of perceived image quality. If a displayed image has high contrast ratio, a viewer will judge it to be sharper than a displayed image with lower contrast ratio, even if the lower contrast image has substantially more measurable resolution.

In current digital display applications, the contrast ratio of the displayed images or videos is limited by reflection of ambient light from the display screens in addition to the performance of the projection systems. In particular, the display screens reflect both ambient light and modulated light from spatial light modulators of the display systems onto viewers' eyes without discrimination. Operating display systems in the absence of ambient light will certainly increase the contrast ratio of the displayed images, which, however is not often possible.

A micromirror array device is a type of microelectromechanical device and has found its applications in digital display systems due to many advantages over traditional spatial light modulators, such as LCOS, and LCD. The display systems having micromirror-based spatial light modulators, however, face the same contrast ratio degradation problem as the other type of display systems do.

Therefore, what is needed is a method and apparatus for reducing the impact of the ambient light so as to improve the contrast ratio of the displayed images in display systems having micromirror-based spatial light modulators.

SUMMARY OF THE INVENTION

In an embodiment of the invention, a projection system is provided. The system comprises: an illumination system providing polarized illumination light; a spatial light modulator having an array of deflectable micromirrors, wherein each micromirror has a reflective surface for reflecting the polarized illumination light; and a display target having a polarized film disposed thereon; wherein the polarized illumination light has a polarization direction that is parallel or perpendicular to an rotation axis of the reflecting surfaces of the micromirrors.

In another embodiment of the invention, a method of producing an image using a projection system is disclosed. The method comprises: providing illumination system for generating illumination light; providing a spatial light modulator having an array of deflectable micromirrors, wherein each micromirror has a reflective surface; polarizing the illumination light into polarized illumination light such that the polarized illumination light has a polarization direction that is parallel or perpendicular to rotation axis a rotation axis of the micromirrors, or is circularly polarized; directing the polarized illumination light onto the reflective surfaces of the micromirrors; reflecting the polarized illumination light onto a display target, wherein the display target has a polarized film coated thereon; and passing a portion of the polarized light through the polarized film so as to generate the image at the display target.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The present invention discloses a projection method and projection system for producing images and videos using micromirrors and polarized light such that reflection of the ambient light from the display screen is depressed so as to improve the contrast ratio of the displayed images. Polarized light can be generated by passing a light beam from an illumination system through a polarizer. The polarization direction (e.g. the direction the electric filed component E of the polarized light beam is parallel or perpendicular to the rotation axis of the reflective deflectable mirror plates, or the polarized light may be circularly or elliptically polarized, or a combination of linearly, circularly and elliptically polarized. The reflected light beams from the mirror plates are still polarized as a result. The polarized reflected light from the reflective surfaces of the mirror plates travels selectively either onto or away from the display target. The display target comprises a polarized film coated thereon and can optionally comprise quarter-wave plate or other type of retardation plate. For linearly polarized light incident to the display target, the polarization directions of the polarized film on the display target and the reflected light are preferably parallel to each other such that the reflected light can pass through the polarized film onto the display target and reflected by the display target onto the viewers' eyes. The polarized film absorbs the around 50% of the ambient light incident thereon except the component having the polarization direction parallel to that of the polarized film. As a result, the reflection of the ambient light from the display target onto the viewers' eyes is significantly depressed.

Figure 1:
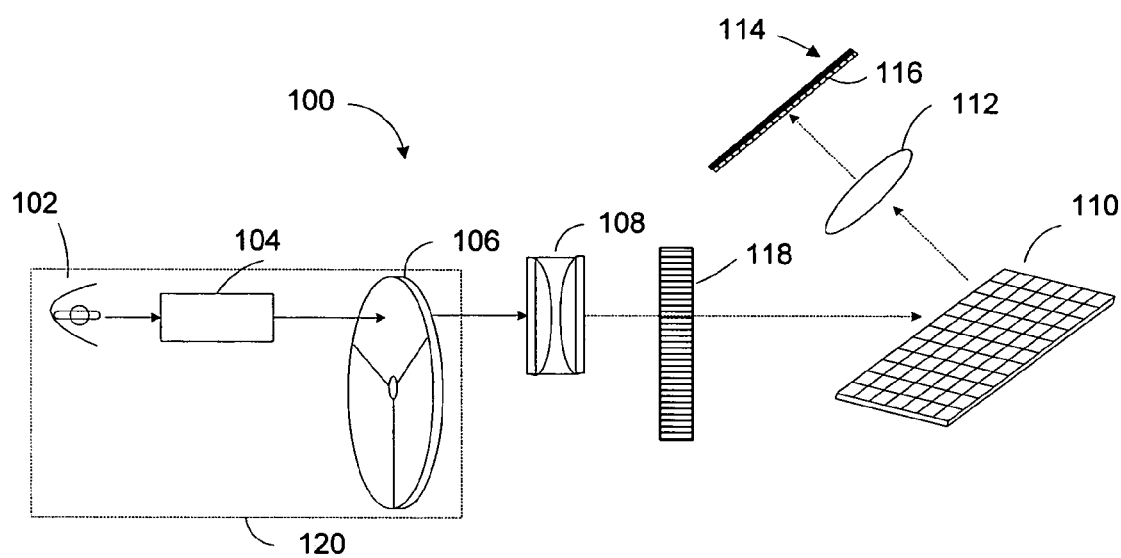
FIG. 1 illustrates an exemplary display system in which embodiment of the invention can be implemented.

FIG. 1 illustrates a display system in which embodiment of the invention can be implemented. In its basic configuration, display system 100 comprises illumination system 120, optical elements 108 and 112, spatial light modulator 110, polarizer 118, and display target 114.

The illumination system provides primary color light that are sequentially applied to the spatial light modulator. In an exemplary configuration, the illumination system comprises light source 102, which can be an arc lamp, lightpipe 104 that can be any suitable integrator of light or light beam shape changer, and color filter 106, which can be a color wheel. In this particular configuration, the color wheel is positioned after the light source and lightpipe on the propagation path of the illumination light from the light source. Other optical configurations can also be used, such as placing the color wheel between the light source and the lightpipe. Optical element 108, which can be a condensing lens, directs the primary color light onto the spatial light modulator in which the primary color light is reflected selectively either into or away from projection lens 112 so as to generate a desired image pattern in the display target. The set of primary colors can comprise any set of three or more colors used to render the output image.

Figure 2:
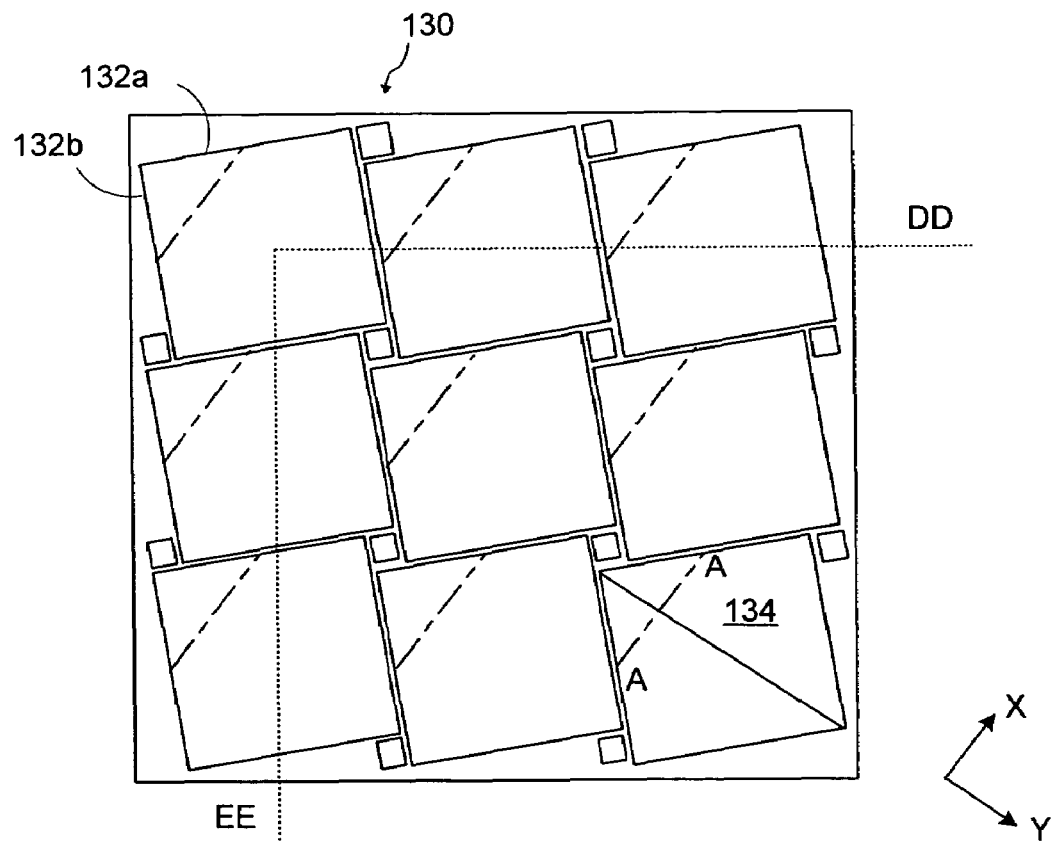
FIG. 2 is a top view of a portion of another exemplary spatial light modulator.

FIG. 2 illustrates a top view of an exemplary spatial light modulator having an array of micromirrors. For simplicity and demonstration purposes, only 3×3 micromirrors are illustrated therein. In this particular example, the micromirrors are tilted a small angle relative the edges of the micromirror array as set forth in U.S. patent application Ser. No. 10/698,563 to Huibers, filed on Oct. 30, 2003, the subject matter being incorporated herein by reference. The tilted angle can be from 2° to 30°, though more likely within the range of from 5° to 25° degrees, (e.g. from 10° to 20° degrees, or around 15° degrees).

The mirror plate of each micromirror rotates around a rotation axis as presented by broken line segments. The rotation axis of the mirror plate is parallel to but offset from a diagonal of the mirror plate when viewed from the top. For example, the mirror plate of micromirror 134 rotates around rotation axis AA. When the mirror plate is at the OFF state, such as within the XY plane in a Cartesian coordinate as shown in the figure, the normal direction of the mirror plate is pointing to the Z direction. During the rotation of the mirror plate, the normal direction rotates in the YZ plane as shown in FIG. 3, and the projection of the normal direction is along the Y direction.

Figure 3:
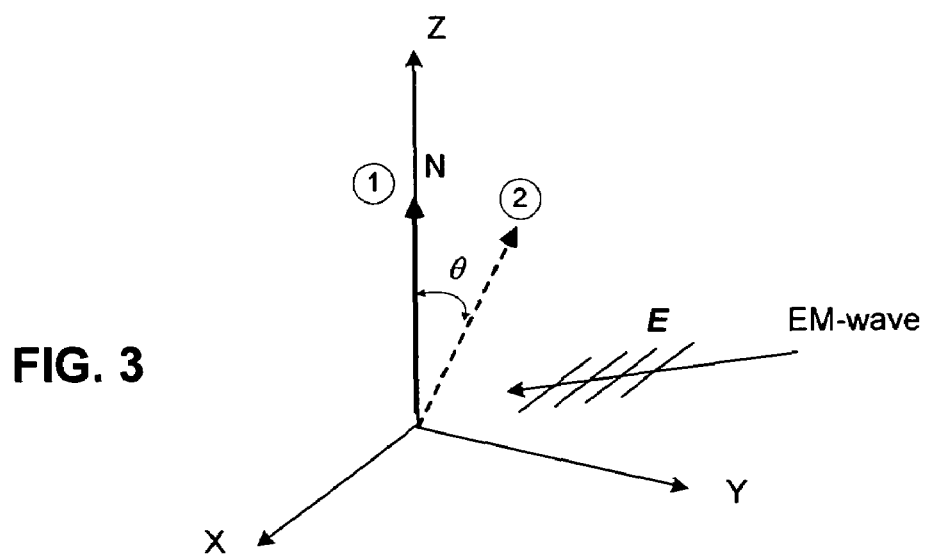
FIG. 3 illustrates the rotation positions of a typical micromirror in the spatial light modulator in a Cartesian coordinate.

Referring to FIG. 3, in the OFF state, the normal direction N of the mirror plate is at position 1 pointing to the Z direction. In response to an electrostatic force, the mirror plate rotates towards the ON state, and the normal direction N rotates within the YZ plane. When the mirror plate is at the ON state, the normal direction is at position 2 having an angle θ relative to the Z axis. The angle θ is referred to as tilt angle, and the direction of a unit vector point from the original point to the position 2 is referred to as tilt direction. In the micromirror array in FIG. 2, the projection of the tilt direction onto the mirror array plane is neither parallel nor perpendicular to the edges of the micromirror array.

Turning back to FIG. 1, for depressing the reflection of the ambient light from the display target, the display target is coated with a polarized film having a particular polarization direction. The ambient light, which can be polarized, or unpolarized is absorbed by the polarized film except the component having a polarization direction parallel to the polarized direction of the polarized film. As a result, 30% or more, or 40% or more, or around 50% of the ambient light is absorbed.

In order to enable the reflected light from the spatial light modulator carrying information of the desired images or videos to pass through the polarized film without being absorbed, the reflected light is naturally desired to be polarized. For this purposes, the illumination light incident onto the micromirrors of the spatial light modulator is preferably polarized. Specifically, the illumination light incident onto the micromirrors is preferably linearly or circularly polarized. Because most current light sources, such as arc lamps emit circularly or ecliptically polarized light or unpolarized, in one embodiment polarizer 108 is thus provided. The polarizer can be positioned at the propagation path of the illumination light and in front of the spatial light modulator. The polarizer can also be included within illumination system 120 as long as it is positioned at or after the light source. In an alternate embodiment, the light source 102 can be engineered to produce polarized light without the need for polarizer 108.

The illumination light directed to the reflective surfaces of the micromirrors in the spatial light modulator is polarized. However, the reflective surfaces of the reflective surfaces of the mirror plates are often composed of metallic materials, such as Al or Ti. A polarized incident light reflected by such metallic surfaces will be modified in its polarization, for example, circularly polarized light can become polarized light, if the polarization direction of the incident light is neither parallel nor perpendicular to the rotation axis of the mirror plates. Therefore, it is preferred that the polarization direction of polarizer 108 is configured such that the illumination light passing through the polarizer has polarization direction that is parallel or perpendicular to the rotation axis of the mirror plates. Since the reflected light from the mirror plates at the OFF state is desired to be away from the display target, whereas the reflected light from the mirror plates at the ON state are desired to be projected onto the display target, the illumination light passing through the polarizer preferably has a polarization direction parallel or perpendicular, and more preferably parallel to the rotation axis of the mirror plates at the ON state. In the exemplary micromirror array in FIG. 2, the rotation axis of the mirror plates at the ON state is preferably from 2° to 30°, though more likely within the range of from 5° to 25° degrees, (e.g. from 10° to 20° degrees, or around 15° degrees) from the normal direction of the mirror plates at the OFF state. Accordingly, the polarized illumination light preferably has a polarization direction that is from 2° to 30°, though more likely within the range of from 5° to 25° degrees, (e.g. from 10° to 20° degrees, or around 15° degrees) with relative to the normal direction of the mirror plates at the OFF state. Alternatively, the polarization direction of the polarized illumination light can be perpendicular to the rotation axis of the mirror plates at the ON state, as shown in FIG. 3. In this instance, the polarization direction of the polarized illumination light is along X axis in the Cartesian coordinate as shown in the figure.

The reflected polarized light carrying information on the desired images or videos is expected to pass through polarized film 116 coated on display target 114 without being absorbed. This can be accomplished by arranging the polarization direction of the polarized film parallel to the polarization direction of the reflected light. For a display target meant to be used in a primarily transmissive way, for example in a rear-projection television unit, in a preferred embodiment the reflected light is circularly polarized and a quarter wave or other retarder (not shown) is placed before display target 114, for the purpose of converting the circularly polarized light to linear polarized light with a polarization direction such that it will not be blocked by polarized film 116. Given the arrangements as discussed above, reflected light from the micromirrors in the spatial light modulators travels freely without being absorbed within the display system, whereas the ambient light incident onto the display target is mostly absorbed by the polarized film coated on the display target. Therefore, reflection of the ambient light is reduced, and the contrast ratio of the displayed images and videos is significantly improved.

Figure 4:
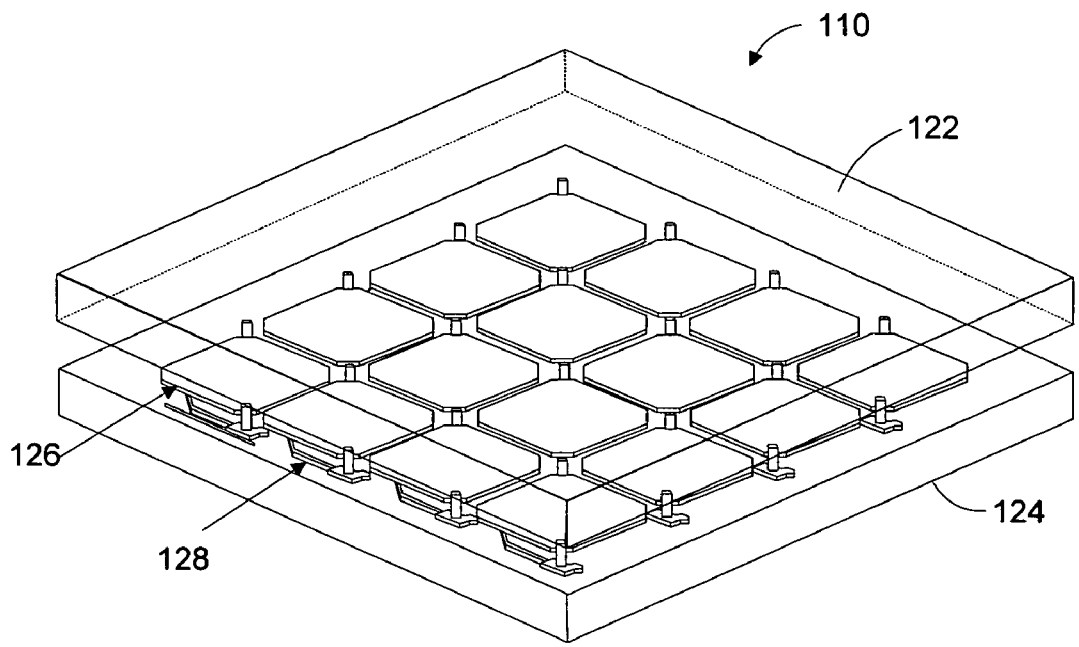
FIG. 4 is a perspective view of an exemplary spatial light modulator comprising an array of micromirrors.

The spatial light modulator in FIG. 1 may have other configurations, one of which is shown in FIG. 4. Referring to FIG. 4, a perspective view of another exemplary spatial light modulator in FIG. 1 is illustrated therein. In this particular example, micromirror array 126 is formed on light transmissive substrate 122, such as glass or quartz. The micromirrors of the micromirror array are individually addressable and deflectable. For deflecting the micromirrors, electrode array 128 formed on semiconductor substrate 124 is provided and placed proximate to the micromirror array such that the mirror plates of the micromirrors can be deflected in response to electrostatic forces derived from electrostatic fields that are established between the mirror plates and electrodes.

In general, the micromirror array of a spatial light modulator for use in a display system generally consists of thousands or millions of micromirrors, the total number of which determines the resolution of the displayed images. For example, the micromirror array of the spatial light modulator may have 1024×768, 1280×720, 1400×1050, 1600×1200, 1920×1080, or even larger number of micromirrors. The large number of micromirrors in a micromirror array may have other geometric configurations, such as that shown in FIG. 5.

Figure 5:
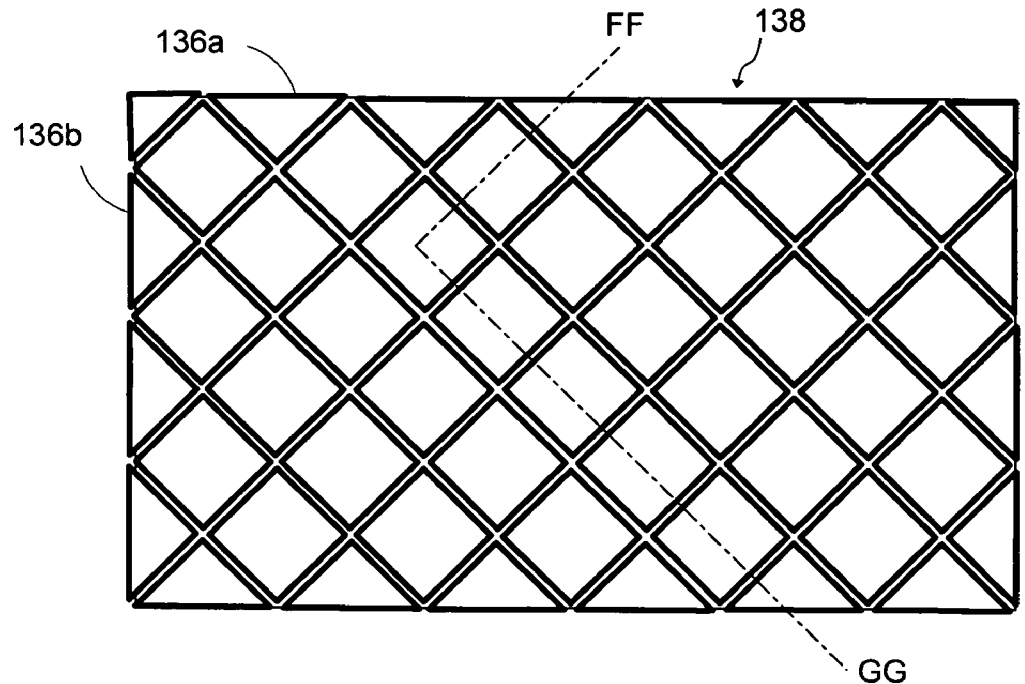
FIG. 5 is a top view of a portion of another exemplary spatial light modulator having an array of micromirrors.

Referring to FIG. 5, the micromirrors of the micromirror array are arranged such that the edges of the micromirrors are neither parallel nor perpendicular to the edges of the micromirror array (e.g. edges 136a and 136b of micromirror array 138). In another way of description, the nearest-neighboring direction FF and GG are neither parallel nor perpendicular to the edges of the micromirror array. A "nearest-neighboring direction" is a direction along which the adjacent micromirrors have the shortest center-to-center distance. In the particular example in FIG. 5, the nearest-neighboring directions each have 45° (or 135°) degrees relative to the edges of the micromirror array. However, the edges of the individual micromirrors are parallel (or perpendicular) to the nearest-neighboring directions.

Figure 6:
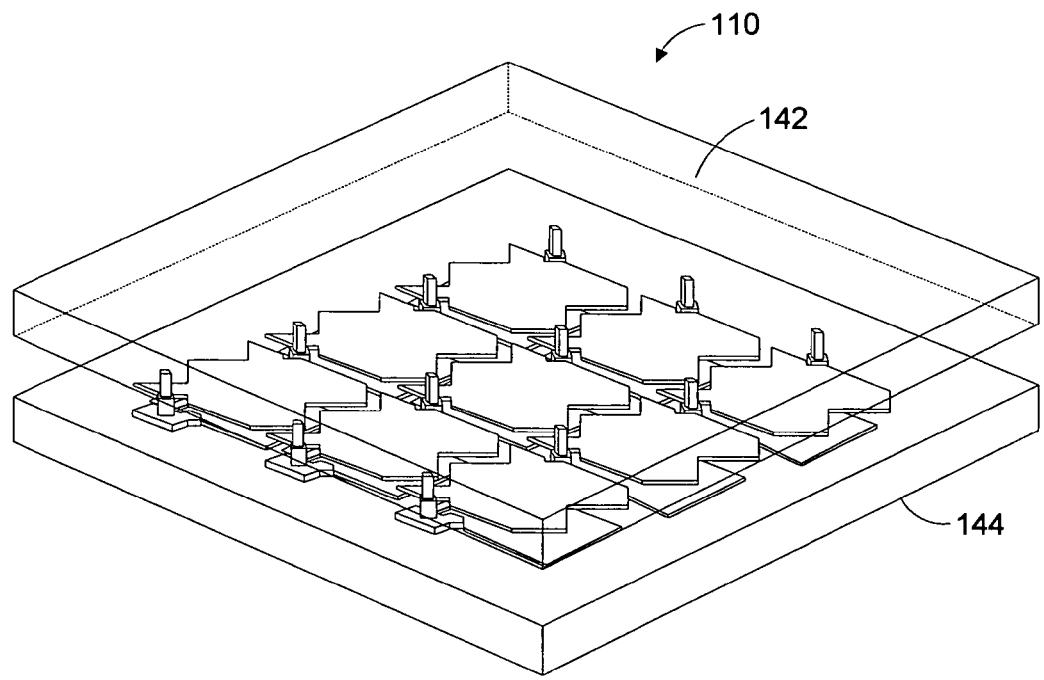
FIG. 6 is a perspective view of yet another exemplary spatial light modulator.

FIG. 6 illustrates yet another exemplary spatial light modulator having an array of micromirrors. Still for simplicity and demonstration purposes, only 3×3 micromirrors are illustrated therein. Unlike the mirror plates of the micromirrors in FIGS. 2, 4, and 5, wherein the mirror plate are substantially square, the mirror plates of the micromirrors in FIG. 6 have jagged edges, which benefits reduction of unwanted light scattering from the edges of the mirror plates.

In the above discussion, the micromirrors are formed on a light transmissive substrate, such as a glass or quartz substrate, while the electrodes are formed on another substrate such as a semiconductor substrate. Alternatively, the micromirrors and the electrodes can be formed on the same substrate, in which case, the substrate can be a semiconductor substrate.

Figure 7:
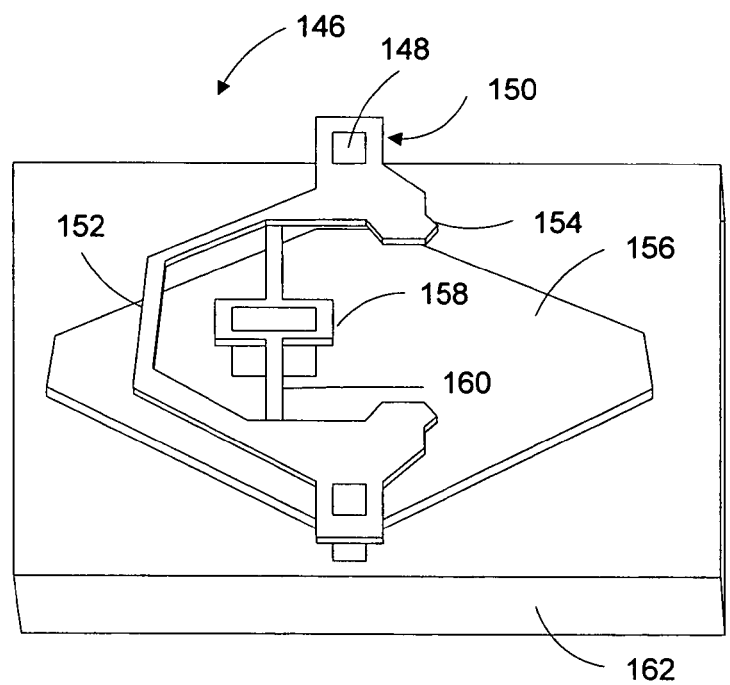
FIG. 7 is a perspective view of an exemplary micromirror of the micromirror array in the spatial light modulator in FIG. 1.

FIG. 7 illustrates an exemplary micromirror of the micromirror array in FIG. 4 or FIG. 5. Micromirror 146 may comprise reflective deflectable mirror plate 156, hinge 160, hinge support 152, and substrate 162. The hinge support is formed on the substrate, and the hinge is held by the hinge support on the substrate. The mirror plate is attached to the hinge such that the mirror plate can rotate above the substrate. The mirror plate can be attached to the hinge via hinge contact 158 with the hinge contact positioned at neither the geometric center of the mirror plate nor a diagonal of the mirror plate. Given this configuration, the mirror plate rotates along a rotation axis that is parallel to but offset from a diagonal of the mirror plate when viewed from the top. Of course, other configurations can be employed.

Figure 8A:
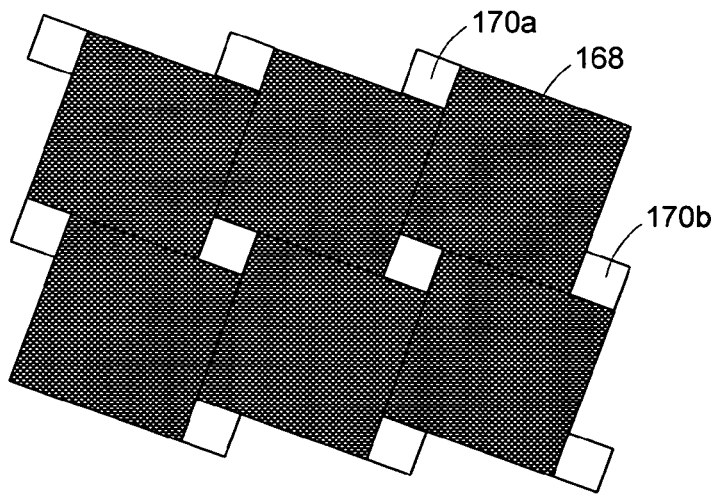
FIG. 8a to FIG. 9 illustrate a top view of yet another exemplary spatial light modulator according to another embodiment of the invention.

Referring to FIG. 8a, a portion of an array of mirror plates of the micromirrors in accordance with yet another embodiment of the invention is illustrated therein. The mirror plates in the array form a plurality of pockets in between. For example, pockets 170a and 170b are formed in which posts for supporting and holding mirror plate 168 can be formed. For individually addressing and deflecting the mirror plates in FIG. 8a, an array of addressing electrodes is provided, a portion of which is illustrated in FIG. 8b.

Figure 8B:
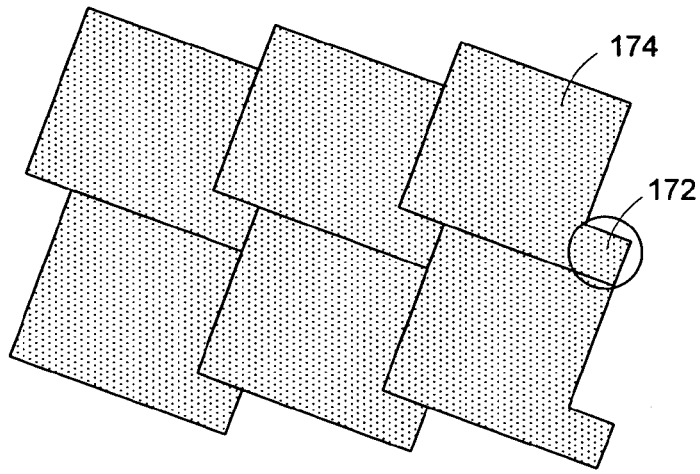

Referring to FIG. 8b, each addressing electrode has an extended portion, such as extended portion 172 of addressing electrode 174. Without the extended portion, the addressing electrode can be generally square, but having an area equal to or smaller than the mirror plate.

Figure 9:
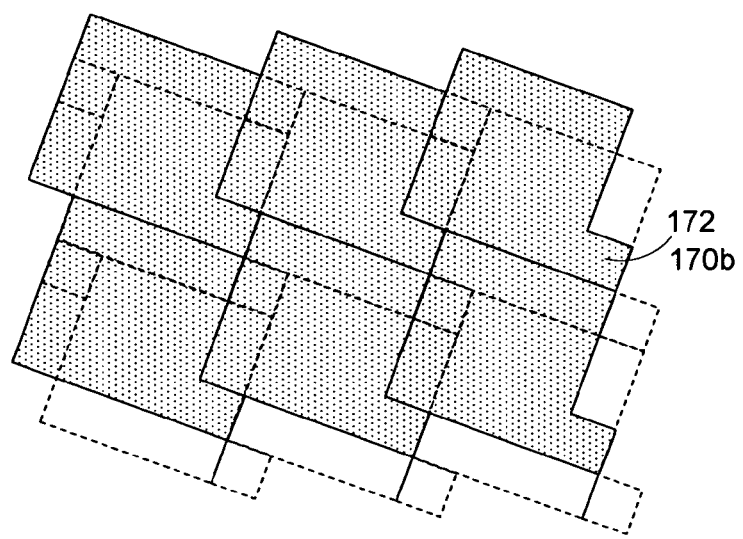

FIG. 9 illustrates a top view of a micromirror array device after the addressing electrodes in FIG. 8b and the mirror plates in FIG. 8a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

The present invention is particular useful for front-projection systems, rear-projection systems, and other projection or display systems, such as computer display systems and cinema projections.

It will be appreciated by those skilled in the art that a new and useful method of micromirror projection of polarized light have been described herein. In view of the many possible embodiments to which the principles of this invention may be applied, however, it should be recognized that the embodiments described herein with respect to the drawing figures are meant to be illustrative only and should not be taken as limiting the scope of invention. Specifically, those of skill in the art will recognize that the illustrated embodiments can be modified in arrangement and detail without departing from the spirit of the invention. For example, the polarizer can be disposed at any place in the propagation path of the illumination light beam but in front of the display target. Additionally, a retarder may be placed in the propagation path of the illumination light beam to change linearly polarized light into circularly polarized light. And the polarizer can be positioned with the polarization direction of the polarizer at any desired angle. For example, the polarizer can be positioned such that the polarization direction of the polarizer is substantially parallel (or orthogonal) to the reflective surface of the micromirror at the ON (or OFF) state. The polarizer can also be positioned such that the electric field E of the illumination light after the polarizer is substantially parallel or perpendicular to the rotation axis of the micromirror. The polarization direction of the polarized film at the display target could be oriented horizontally, vertically, at a 45 degree angle, or at a different angle.

Figure 10:
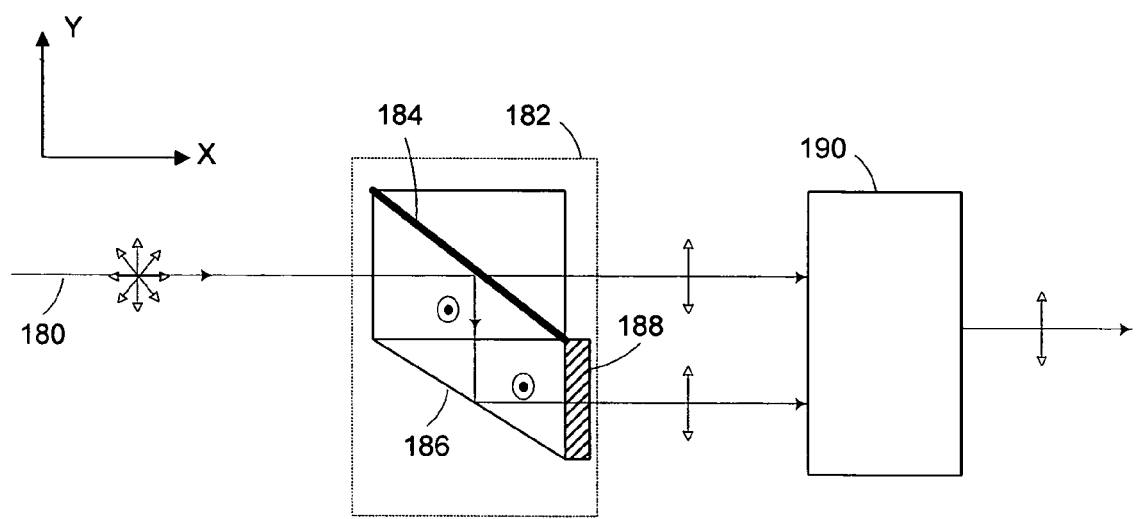
FIG. 10 demonstratively illustrates a polarizer disposed at the entrance of a lightpipe for providing a polarized illumination light beam for the projection system.

Referring to FIG. 10, light beam 180 from a light source of the projection system propagates along the X axis of a XYZ Cartesian coordinate as shown in the figure with the Z axis pointing outside from the paper. Assuming light beam 180 is un polarized, a portion of this light beam passes through polarizing beam splitter 184 that has a polarization direction along the Y axis. The light beam passes through the beam splitter polarizes along the Y axis. The other portion of the light beam with the polarization direction along the Z direction and incident onto the beam splitter is then projected by the beam splitter to a reflective surface of prism 186. The reflective surface of prism 186 reflects the Z-axis polarized light beam towards λ/4 plate 188, after which the Z-axis polarized light beam is transferred into a light beam polarized along the Y axis, as shown in the figure. The light beam that passes through the beam splitter; and the light beam that passes through the λ/4 plate are both collected by lightpipe 190, and delivered to the micromirrors after the lightpipe. It can be seen that by including the polarization function in the lightpipe assembly 182, 50% or more, or 60% or more, or 70% or more, or 90% or more of the light beam from the light source can be collected by the lightpipe and delivered to the micromirrors.

We claim:

1. A projection system, comprising:
an illumination system providing polarized illumination light;
a spatial light modulator having an array of deflectable micromirrors, wherein each micromirror has a reflective surface for reflecting the polarized illumination light, wherein the polarization direction of the polarized illumination light is selected to be substantially parallel or perpendicular to a rotation axis of the reflecting surface of the micromirror; and
a display target having a polarized film disposed thereon;
wherein the polarized illumination light is polarized so that it passes through the polarized film preferentially to unpolarized light.

2. The system of claim 1, wherein the reflective surfaces of the micromirrors comprise a metallic material.

3. The system of claim 2, wherein the metallic material comprises aluminum.

4. The system of claim 2, wherein the metallic material comprises titanium.

5. The system of claim 1, wherein the polarizer has a polarization direction that is parallel to a polarization direction of the reflected light from the micromirrors.

6. The system of claim 1, wherein the display target additionally comprises a retarder film.

7. The system of claim 6, wherein the retarder film is a quarter wave plate.

8. A method of producing an image using a projection system, comprising:
providing illumination system for generating illumination light;
providing a spatial light modulator having an array of deflectable micromirrors, wherein each micromirror has a reflective surface;
polarizing the illumination light into polarized illumination light such that the polarization direction of the polarized illumination light is selected to be substantially parallel or perpendicular to a rotation axis of the reflective surfaces of the micromirrors;
directing the polarized illumination light onto the reflective surfaces of the micromirrors;
reflecting the polarized illumination light onto or away from a display target based on the image, wherein the display target has a polarized film coated thereon; and
passing a portion of the reflected light through the polarized film so as to generate the image on the display target.

9. The method of claim 8, wherein the reflective surfaces of the micromirrors comprise a metallic material.

10. The method of claim 9, wherein the metallic material comprises aluminum.

11. The method of claim 9, wherein the metallic material comprises titanium.

12. The method of claim 8, wherein the polarizer has a polarization direction that is parallel to a polarized direction of the reflected light from the micromirrors.

13. The system of claim 8, wherein the display target additionally comprises a retarder film.

14. The system of claim 13, wherein the retarder film is a quarter wave plate.

15. A projection system, comprising:
a light source providing illumination light;
a first polarizer that polarizes the illumination light;
a spatial light modulator having an array of deflectable micromirrors, wherein each micromirror has a reflective surface for reflecting the polarized illumination light and wherein the polarization direction of the polarized illumination light after the first polarizer is substantially parallel or perpendicular to a rotation axis of the reflecting surface of the micromirror; and
a display target comprising a second polarizer;
wherein the first polarizer passes more than 50 percent of the illumination light to the spatial light modulator.

16. The projection system of claim 15, wherein the first polarizer passes a first portion of the polarized light and rejects a second portion, and wherein the first polarizer comprises a quarter lambda plate to change the polarization direction of the second portion before the second portion, along with the first portion, are incident on the micromirrors.

17. The projection system of claim 15, wherein 60% or more of the illumination light from the light source is delivered to the spatial light modulator.

18. The projection system of claim 15, wherein 75% or more of the illumination light from the light source is delivered to the spatial light modulator.

19. The projection system of claim 15, wherein the reflective surfaces of the micromirrors comprise a metallic material.

20. The projection system of claim 15, wherein the first polarizer is attached to a lightpipe at an entrance of the lightpipe.

21. The projection system of claim 20, wherein the lightpipe is positioned after a color wheel and the light source at the propagation path of the illumination light.

22. The projection system of claim 20, wherein the lightpipe is positioned between a color wheel and the light source at the propagation path of the illumination light.

23. The projection system of claim 15, wherein the second polarizer comprises a polarization direction that is substantially parallel to the polarization direction of the first polarizer.

24. The projection system of claim 15, wherein the second polarizer is positioned such that the polarization direction of the second polarizer is substantially parallel to the reflective surface of the micromirror at the ON state.

25. The projection system of claim 15, wherein the second polarizer is positioned such that the polarization direction of the second polarizer is substantially parallel to the normal direction of the reflective surface of the micromirror at the ON state.

26. The projection system of claim 15, wherein the second polarizer is positioned such that the polarization direction of the second polarizer is substantially parallel to the reflective surface of the micromirror at the OFF state.

27. The projection system of claim 15, wherein the second polarizer is positioned such that the polarization direction of the second polarizer is substantially parallel to the normal direction of the reflective surface of the micromirror at the OFF state.

* * * * *